United States Patent Office 3,631,184
Patented Dec. 28, 1971

3,631,184
WATER-INSOLUBLE ANTHRAQUINONE
DYESTUFFS
Jean-Frederic GuyeVuilleme, Basel, Switzerland, assignor to Ciba Limited, Basel, Switzerland
No Drawing. Filed June 17, 1966, Ser. No. 558,245
Claims priority, application Switzerland, July 1, 1965, 9,226/65; May 16, 1966, 7,099/66
Int. Cl. C09b 1/50
U.S. Cl. 260—380         2 Claims

ABSTRACT OF THE DISCLOSURE

New water-insoluble anthraquinone dyestuffs containing dihydroxy, diamino and an aryl substituent, said dyestuff containing at least one halo substituent on the anthraquinone and/or aryl moiety.

---

The present invention is based on the observation that valuable water-insoluble anthraquinone dyestuffs are obtainable when a dihydroxydiaminoanthraquinone of the formula

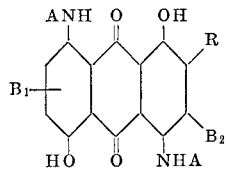

in which A, $B_1$ and $B_2$ represent hydrogen atoms or, if necessary alkyl residues substituted, for example, by hydroxyl, acyloxy or phenyl groups, and R represents an aryl residue, especially a benzene residue, which contains at least one hydroxyl, alkoxy, phenoxy or acyloxy group in ortho-position or para-position to the anthraquinone residue, is treated with halogenating agents.

The present invention also provides halogenated, dihydroxydiaminoanthraquinones of the general formula

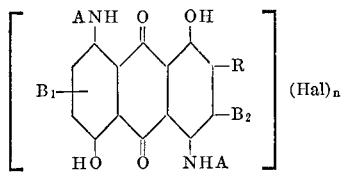

wherein A, $B_1$, $B_2$ and R have the meanings given above and $n$ represents a number within the range of from 0.5 to 2.5.

As examples there may be mentioned the following dihydroxydiaminoanthraquinones:

1,5-dihydroxy-4,8-diamino-2-(4'-hydroxyphenyl)-anthraquinone,
1,5-dihydroxy-4,8-diamino-2-(4'-hydroxy-3'-chlorophenyl)-anthraquinone,
1,5-dihydroxy-4,8-diamino-2-(4'-methoxyphenyl)anthraquinone,
1,5-dihydroxy-4,8-diamino-2-(4'-hydroxy-3'-methylphenyl)-anthraquinone,
1,5-dihydroxy-4,8-diamino-2-(4'-hydroxy-2'-methylphenyl)-anthraquinone,
1,5-dihydroxy-4,8-diamino-2-(2'-hydroxy-5'-methtylphenyl)-anthraquinone,
1,5-dihydroxy-4,8-diamino-2-(2'-hydroxy-5'-ethylphenyl)-anthraquinone,
1,5-dihydroxy-4,8-diamino-2-(4'-hydroxy-3'-amylphenyl)-anthraquinone,
1,5-dihydroxy-4,8-diamino-2-(2'-hydroxy-5'-amylphenyl)-anthraquinone,
1,5-dihydroxy-4,8-diamino-2-(2'-hydroxy-5'-octylphenyl)-anthraquinone,
1,5-dihydroxy-4,8-diamino-2-(2'-hydroxy-5'-cyclohexylphenyl)-anthraquinone,
1,5-dihydroxy-4,8-diamino-2-(4'-hydroxy-3'-phenylphenyl)-anthraquinone,
1,5-dihydroxy-4,8-diamino-2-(2'-hydroxy-5'-phenylphenyl)-anthraquinone,
1,5-dihydroxy-4,8-diamino-2-(4'-hydroxy-3',5'-dimethylphenyl)-anthraquinone,
1,5-dihydroxy-4,8-diamino-2-(3',4'-dimethoxyphenyl)-anthraquinone,
1,5-dihydroxy-4,8-diamino-2-(2',5'-dimethoxyphenyl)-anthraquinone,
1,5-dihydroxy-4,8-diamino-2-(4'-benzyloxyphenyl)-anthraquinone,
1,5-dihydroxy-4,8-diamino-2-(4'-hydroxy-3'-methoxyphenyl)-anthraquinone,
1,5-dihydroxy-4,8-diamino-2-(3',4'-dihydroxyphenyl)-anthraquinone,
1,5-dihydroxy-4,8-diamino-2-(2',4'-dihydroxyphenyl)-anthraquinone,
1,5-dihydroxy-4,8-diamino-2-(2',5'-dihydroxyphenyl)-anthraquinone,
1,5-dihydroxy-4,8-diamino-2-(2',4',6'-trihydroxyphenyl)-anthraquinone,
1,5-dihydroxy-4,8-diamino-2-(4'-phenoxyphenyl)-anthraquinone,
1,5-dihydroxy-4,8-diamino-2-(2'-hydroxynaphthyl-1')-anthraquinone,
1,5-dihydroxy-4,8-diamino-2-(4'-hydroxynaphthyl-1')-anthraquinone,
1,5-dihydroxy-4-amino-8-methylamino-2-(4'-hydroxyphenyl)-anthraquinone,
1,5-dihydroxy-4,8-dimethylamino-2-(4'-hydroxyphenyl)-anthraquinone,
1,5-dihydroxy-4-amino-8-hydroxyethylamino-2-(4'-hydroxyphenyl)-anthraquinone,
1,5-dihydroxy-4-hydroxyethylamino-8-amino-2-(4'-hydroxyphenyl)-anthraquinone,
1,5-dihydroxy-4-amino-8-acetoxyethylamino-2-(4'-methoxyphenyl)-anthraquinone,
1,5-dihydroxy-4-amino-8-benzoyloxyethylamino-2-(4'-hydroxyphenyl)-anthraquinone.

These compounds are obtainable by additively combining hydroxy- or alkoxy-benzenes with boric acid esters of 1,5-dihydroxy-4,8 - diaminoanthraquinone - 2,6-disulphonic acid dissolved in concentrated sulphuric acid in accordance wtih German patent specification No. 445,269, boiling the addition product in an acidic aqueous solution or heating it at 20 to 60° C. in an alkaline solution, during which process a sulphonic acid group is split off, according to German patent specification No. 446,563, and reductive elimination of the sulphonic acid group still present and, if necessary, treating the 1,5-dihydroxy-4,8-diamino-2-phenylanthraquinones so obtained with alkylating and/or acylating agents, for example, ethyl bromide, ethyl chloride, ethylenechlorohydrin and benzyl chloride, and also alkylsulphonic acid esters, for example, para-tolene-sulphonic acid methylester, alkyl sulphates, for example, dimethyl or diethyl sulphates, aldehydes, especially formaldehyde, alkylene oxides, for example, ethylene oxide, chloroformic acid chloroethylester, chloroformic acid-β-chloroisopropylester, chloroformic acid-1-phenyl-2-chloroacetylester or epichlorohydrin, acetic anhydride or benzoyl chloride.

Alkylation or acylation is advantageously carried out by heating in an inert organic solvent, for example, a halogenated hydrocarbon, for example, chlorobenzene, orthodichlorobenzene, a nitro-hydrocarbon, for example, nitrobenzene or nitronaphthalene, a hydroxybenzene, for example, phenol or a cresol, an acid amide, for example, dimethylformamide or N-methylpyrrolidone, dimethyl sulphoxide or pyridine. It is advantageous to use an agent capable of binding acid, for example, an alkali carbonate, when alkylating with alkyl halides.

It is advantageous to use free halogens as halogenating agents, for example, chlorine or especially bromine, or halogen-yielding agents, for example, sulphuryl chloride. Halogenation is advantageously carried out in the presence of a solvent or diluent, for example, a mineral acid, for example, sulphuric acid or a concentrated hydrohalic acid, a fatty acid, for example, formic acid or acetic acid or in an inert solvent, for example, nitrobenzene, a halogenated benzene, pyridine or dimethylformamide. Halogenation is advantageously carried out at a raised temperature. If necessary, one of the usual halogenation catalysts, for example, iodine or a ferric halide, can be added to the reaction mixture.

The new dihydroxydiaminoanthraquinones or the mixtures thereof contain 0.5 to 2.5 atoms of halogen in the molecule and are valuable dyestuffs that have excellent affinity for polyester fibres, especially polyethylene terephthalate fibres, and dye these fibres pure blue to greenish blue tints possessing an excellent fastness to light and to sublimation. The new dyestuffs also display good building-up properties and ensure good reservation of cotton.

For dyeing, the new dyestuffs are advantageously used in a state of fine division and are applied in the presence of a dispersing agent, for example, soap, sulphite cellulose waste liquor or a synthetic detergent, or in the presence of a combination of different wetting and dispersing agents. It is generally advantageous to convert the dyestuffs into dyeing preparations prior to dyeing, which preparations contain a dispersing agent and finely divided dyestuff in a form such that a fine disperion forms when the dyestuff preparations are diluted with water. Dyestuff preparations of the kind defined may be produced in known manner, for example, by reprecipitating the dyestuff from sulphuric acid and grinding the suspension so obtained with sulphite cellulose waste liquor, if necessary, also by grinding the dyestuff in a highly efficient grinding device in the dry state or wet state in the presence or absence of a dispersing agent.

By virtue of their fastness to alkali, the new dyestuffs are specially suitable for application by the so-called thermofixation process, in which process the fabric to be dyed is impregnated at a temperature not exceeding 60° C. with an aqueous dispersion of the dyestuff which contains advantageously 1 to 50% of urea and a thickening agent, especially sodium alignate, and is then squeezed in the usual manner. Squeezing is advantageously effected in a manner such that the impregnated fabric retains 50 to 100% of its dry weight of dyeliquor.

To bring about fixation of the dyestuff, the impreganted fabric is heated to a temperature above 100° C., for example, to a temperature between 180 and 220° C., it being advantageous to dry the fabric, for example, in a current of hot air, prior to the heat treatment.

The above-mentioned thermofixation process is specially suitable for the dyeing of union fabrics made from polyester fibres and cellulosic fibres, especially cotton. In this case, the padding liquid contains, in addition to the dyestuffs of the invention, dyestuffs that are suitable for dyeing cotton, especially vat dyestuffs or reactive dyestuffs, that is to say, dyestuffs that can be fixed on the cellulosic fibre with formation of a chemical bond, for example, dyestuffs that contain a chlorotriazine or chlorodiazine residue. In the last-mentioned case, it has been found to be advantageous to add an agent capable of binding acid to the padding solution, for example, an alkali carbonate, an alkali phosphate, an alkali borate or an alkali perborate or a mixture of these compounds. When using vat dyestuffs it is necessary to treat the padded fabric with an aqueous alkaline solution of one of the reducing agents commonly used in vat dyeing subsequent to the heat treatment.

The dyeings obtained are advantageously subjected to an aftertreatment, for example, by heating with an aqueous solution of a non-ionic detergent.

The dyestuffs can also be applied by printing techniques. In this method of application, there is used, for example, a printing paste which contains, in addition to the usual adjuvants, for example, wetting and thickening agents, the finely divided dyestuff, if necessary, in admixture with one of the above-mentioned cotton dyestuffs, if necessary, in the presence of urea and/or an agent capable of binding acid.

The following examples illustrate the invention. Unless otherwise stated, the parts and percentages are by weight.

EXAMPLE 1

A mixture of 20 parts of 1,5-dihydroxy-4,8-diamino-2-(4'-methoxy)-phenylanthraquinone, a very small portion of ferric bromide (about 0.1 part) and 1,370 parts of glacial acetic acid is boiled for 20 minutes under reflux. 17.2 parts of bromine are added dropwise at that temperature in a uniform manner in the course of 2 hours, and the whole is boiled for a further four hours under reflux. The batch is then poured into 5,000 parts of water, filtered and dried. 25.3 parts of a greenish blue dyestuff containing about 24% of bromine are obtained, which dyestuff dyes polyethylene terephthalate fibres pure blue tints possessing a very good fastness to light and to sublimation. The dyestuff is also distinguished by its good building-up properties and its ability to reserve cotton well. It can also be applied by the thermofixation process in the presence of alkali.

Dyeing prescription 1 part of the dyestuff obtained in the manner described in the preceding paragraph is ground in the wet state with 2 parts of a 50% aqueous solution of sulphite cellulose waste liquor and the mixture is dried.

The dyestuff preparation so obtained is mixed with 40 parts of a 10% aqueous solution of a condensation product obtained from octadecyl alcohol and 20 mols of ethylene oxide, and then 4 parts of a 40% acetic acid solution are added. A dyebath of 4,000 parts is prepared therefrom by dilution with water.

100 parts of cleansed polyester fibre material are entered into this dyebath at 50° C., the temperature is raised to 120 to 130° C., in the course of half an hour and dyeing is carried out for one hour at that temperature in a closed vessel. Subsequently, the material is well rinsed. A pure blue dyeing possessing an excellent fastness to light and to sublimation is obtained.

EXAMPLE 2

A mixture of 7.9 parts of 1,5-dihydroxy-4,8-diamino-2-(4'-acetoxyphenyl)-anthraquinone, a very small portion of ferric bromide (about 0.1 part) and 395 parts by volume of glacial acetic acid is boiled for 20 minutes under reflux. 6.8 parts of bromine are added dropwise at that temperature in a uniform manner in the course of 2 hours and the whole is boiled for a further four hours under reflux. The glacial acetic acid is distilled in a rotary evaporator and the product is dried. 11.5 parts of a greenish blue dyestuff containing about 35.7% of bromine are obtained; the percentage corresponds to about 2.5 atoms of bromine per molecule. The dyestuff dyes polyethylene terephthalate fibres pure blue tints possessing a very good fastness to light and to sublimation.

EXAMPLE 3

A mixture of 2.8 parts of 1,5-dihydroxy-4-(or 8-) amino-8-(or 4-) methylamino-2 - (4' - methoxyphenyl)-anthraquinone, a very small portion of ferric bromide (about 0.1 part) and 110 parts by volume of nitrobenzene is heated to 120° C. and stirred for 15 minutes. 2.4 parts of bromine are added dropwise at that temperature in a uniform manner in the course of 20 minutes and the whole is stirred for a further 5 hours at the same temperature.

The batch is allowed to cool, subjected to steam distillation until all the nitrobenzene has been removed, filtered and dried. 3.1 parts of a greenish blue dyestuff containing about 16.2% of bromine are obtained, which dyestuff dyes polyethylene terephthalate fibres pure blue tints possessing a very good fastness to light and to sublimation.

A dyestuff having similar properties is obtained by using 1,5-dihydroxy-4,8-dimethylamino-2-(4' - methoxyphenyl)-anthraquinone as starting material and proceeding in the same manner as that described in the preceding paragraph.

EXAMPLE 4

A mixture of 10 parts of 1,5-dihydroxy-4-(or 8-) amino-8-(or 4-) hydroxyethylamino-(4'-methoxyphenyl)-anthraquinone, a very small portion of ferric bromide (about 0.1 part), 10 parts of sodium acetate and 1,000 parts by volume of glacial acetic acid is heated to the boil. 4.5 parts of bromine are added dropwise at that temperature in a uniform manner in the course of 1½ hours. The batch is then stirred for 12 hours at room temperature, poured into 2,500 parts of water, the whole is boiled up, filtered and dried. 8.9 parts of a greenish blue dyestuff containing about 5% of bromine are obtained, which dyestuff dyes polyethylene terephthalate fibres pure blue tints possessing a very good fastness to light and to sublimation.

EXAMPLE 5

60 parts of 1,5-dihydroxy-4,8-diamino-2-(4'-methoxyphenyl)-anthraquinone and 600 parts of nitrobenzene are heated to the boil. The batch is allowed to cool to 110° C. and 1 part of ferric bromide is added. 11 parts by volume of liquid chlorine are introduced in a uniform manner in the course of 3¼ hours in the gaseous state, and stirring is continued for a further 15 hours at the same temperature. The batch is allowed to cool, subjected to steam distillation until the whole amount of nitrobenzene has been removed, filtered and dried. 68.5 parts of a greenish blue dyestuff containing about 12.8% of chlorine are obtained, which dyestuff dyes polyethylene terephthalate fibres pure blue tints possessing a very good fastness to light and to sublimation.

EXAMPLE 6

37.5 parts of 1,5-dihydroxy-4,8-diamino-2-(4'-hydroxyphenyl)-anthraquinone, 0.15 part of ferric bromide and 1,875 parts by volume of glacial acetic acid are boiled together for 20 minutes under reflux. 32.1 parts of bromine are added dropwise at that temperature in a uniform manner in the course of 2½ hours, and the whole is boiled for a further 6 hours under reflux. The glacial acetic acid is removed by means of a rotary evaporator and the batch is subsequently dried. 53.5 parts of a greenish blue dyestuff containing about 30% of bromine are obtained, which dyestuff dyes polyethylene terephthalate fibres pure blue tints possessing a very good fastness to light and to sublimation.

A dyestuff having a bromine content of 35%, which corresponds to about 2.5 bromine atoms, is obtainable by increasing the amount of bromine used.

Dyestuffs having similar properties are obtained by using as starting material 1,5-dihydroxy-4,8-diamino-2-(3',4'-dihydroxyphenyl)-anthraquinone or 1,5-dihydroxy-4,8-diamino-2-(2',4'-dihydroxyphenyl)-anthraquinone.

EXAMPLE 7

5 parts of a mixture of 1,5-dihydroxy-4,8-diamino-2-(4'-hydroxyphenyl)-6-(or 7-) methylanthraquinone and 4-(or 8-) amino-1,5,8 (or 1,5,4-) trihydroxy-6-(or 7-) methyl-2-(4'-hydroxyphenyl)-anthraquinone, a very small portion of ferric bromide (about 0.05 part) and 60 parts by volume of $C_6H_5NO_2$ are heated together at the boil. The batch is cooled to 110° C. and 4.3 parts of bromine are added dropwise at that temperature in a uniform manner in the course of 3 hours. The whole is stirred for a further 10 hours at the same temperature. The batch is allowed to cool and is then subjected to steam distillation until the whole amount of nitrobenzene has been removed. The batch is then filtered and dried. 6.5 parts of a blue dyestuff containing about 22% of bromine are obtained, which dyestuff dyes polyethylene terephthalate fibres pure blue tints possessing a very good fastness to light and to sublimation.

EXAMPLE 8

3.75 parts of 1,5-dihydroxy-4,8-diamino-2-(4'-hydroxyphenyl)-anthraquinone are added to 50 parts by volume of nitrobenzene and the batch is heated to 35° C. 5 parts of sulphuryl chloride are added dropwise at that temperature in a uniform manner in the course of 2 hours, the batch is heated to 45° C. and kept at that temperature for 5 hours. The whole is subjected to steam distillation until the whole amount of $C_6H_5NO_2$ has been removed and then filtered and dried 4.8 parts of a blue dyestuff are obtained (chlorine content: 18%). It dyes polyethylene terephthalate fibres pure blue tints possessing a very good fastness to light and to sublimation.

EXAMPLE 9

10 parts of 1,5-dihydroxy-4,8-diamino-2-(4'-methoxyphenyl)-anthraquinone, a very small portion of ferric bromide (about 0.1 part), 10 parts of $CH_3COONa$ and 100 parts by volume of pyridine are heated together at the boil. The batch is cooled to 100° C. and 4.5 parts of bromine are added dropwise at that temperature in a uniform manner in the course of 1½ hours. The batch is allowed to cool while stirring and is then poured into 2,000 parts of water. The whole is heated, 60 grams of NaCl are added, titration is carried out and the batch is dried. A blue dyestuff containing about 15% of bromine is obtained, which dyestuff dyes polyethylene terephthalate fibres pure tints possessing a very food fastness to light and to sublimation.

Dimethylformamide can be used as solvent with the same success as pyridine.

EXAMPLE 10

5 parts of 1,5-dihydroxy-4,8-diamino-2-(4'-methoxyphenyl)-anthraquinone are dissolved at 50 to 52° C. in the course of 2½ hours in 60 parts by volume of $H_2SO_4$ of 50% strength. 0.05 part of $I_2$ is added and then 3.5 parts of bromine are added dropwise at a uniform rate in the course of 2 hours. The whole is then stirred for a further 12 hours at the same temperature. The batch is poured into 60 parts of water, kept at the boil for 1 hour, filtered and dried. 6.4 parts of a blue dyestuff containing about 25.3% of bromine are obtained, which dyestuff dyes polyethylene terephthalate fibres pure blue tints possessing a very good fastness to light and to sublimation.

EXAMPLE 11

3.8 parts of 1,5-dihydroxy-4,8-diamino-2-(4'-methoxyphenyl)-anthraquinone and 50 parts by volume of nitrobenzene are heated to 35° C. 5 parts of sulphuryl chloride are then added dropwise at a uniform rate in the course of 2½ hours and the mixture is stirred at 45° C. for a further 5 hours. The whole is subjected to steam distillation until the whole amount of nitrobenzene has been removed, whereupon it is filtered and dried. 4.3 parts of a greenish blue dyestuff containing about 19% of chlorine are obtained, which dyestuff dyes polyethylene terephthalate fibres pure blue tints possessing a very good fastness to light and to sublimation.

EXAMPLE 12

10 parts of 1,5-dihydroxy-4,8-diamino-2-(4'-hydroxy-3-methylphenyl)-anthraquinone, a very small portion of ferric bromide (about 0.1–0.08 part) and 120 parts by volume of nitrobenzene are heated together at the boil. The batch is cooled to 110° C. and 8.6 parts of bromine are added dropwise at that temperature at a uniform rate in the course of 3 hours and the whole is stirred for a further 10 hours at the same temperature. The batch is allowed to cool and the whole is subjected to steam distillation until the whole amount of nitrobenzene has been removed, whereupon the batch is filtered and dried. 12.8 parts of a greenish blue dyestuff containing about 22.8% of bromine are obtained, which dyestuff dyes polyethylene terephthalate fibres pure blue tints possessing a very good fastness to light and to sublimation.

What is claimed is:

1. The dyestuff of the formula

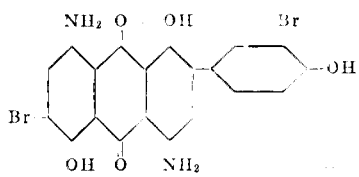

2. The dyestuff of the formula

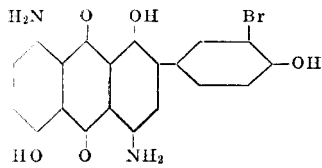

References Cited

UNITED STATES PATENTS

| | | | |
|---|---|---|---|
| 3,043,646 | 7/1962 | Buecheler | 260—380 X |
| 3,164,615 | 1/1965 | Buecheler | 260—376 |
| 3,265,460 | 8/1966 | Hoare | 260—380 X |
| 3,349,104 | 10/1967 | Lodge | 260—376 |

LORRAINE A. WEINBERGER, Primary Examiner

E.J. SKELLY, Assistant Examiner

U.S. Cl. X.R.

8—39, 40; 260—376, 379